Figure 1:
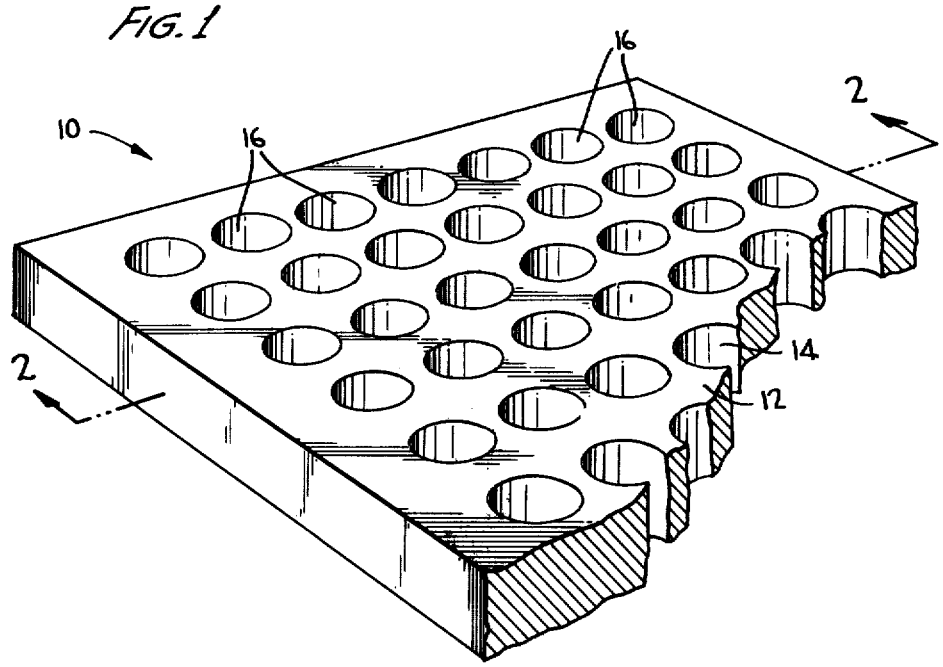

United States Patent [19]
Holden

[11] 3,919,369
[45] Nov. 11, 1975

[54] METHOD OF MANUFACTURING A SELF-CONTAINED LOW PRESSURE DROP FILTER

[75] Inventor: Herbert K. Holden, Bon Air, Va.

[73] Assignee: American Filtrona Corporation, Richmond, Va.

[22] Filed: Nov. 27, 1972

[21] Appl. No.: 309,932

Related U.S. Application Data

[60] Division of Ser. No. 121,989, March 8, 1971, Pat. No. 3,715,869, which is a continuation-in-part of Ser. No. 764,788, Oct. 3, 1968, Pat. No. 3,611,678.

[52] U.S. Cl. .............. 264/45.1; 55/387; 117/161 R; 117/161 K; 117/161 UF; 264/54; 264/112; 264/156; 264/45.3
[51] Int. Cl. .......................................... B29d 27/00
[58] Field of Search ......... 55/387; 131/265; 264/54, 264/122, 125, 126, 156, DIG. 5, 45.1; 425/78, 412; 117/161 L, 161 UF, 166

[56] References Cited
UNITED STATES PATENTS

| | | | |
|---|---|---|---|
| 1,573,982 | 2/1926 | Macadam et al. | 117/166 |
| 1,966,553 | 7/1934 | Kropp | 55/387 |
| 2,510,841 | 6/1950 | Stowe | 425/412 |
| 2,779,687 | 1/1957 | Buchanan et al. | 117/161 UF |
| 2,787,579 | 4/1957 | Weel | 117/166 |
| 2,933,455 | 4/1960 | Doying | 210/502 |
| 3,217,715 | 11/1965 | Berger et al. | 55/387 |
| 3,421,932 | 1/1969 | McGregor et al. | 264/54 |
| 3,474,600 | 10/1969 | Tobias | 210/485 |
| 3,611,678 | 10/1971 | Holden | 55/387 |
| 3,645,072 | 2/1972 | Clapham | 55/387 |

FOREIGN PATENTS OR APPLICATIONS

| | | | |
|---|---|---|---|
| 228,837 | 2/1925 | United Kingdom | 55/387 |
| 1,008,092 | 10/1965 | United Kingdom | 131/265 |
| 1,182,646 | 2/1970 | United Kingdom | 264/DIG. 5 |

Primary Examiner—Philip E. Anderson
Attorney, Agent, or Firm—Holman & Stern

[57] ABSTRACT

A bonded activated carbon filter and a method for making the same are disclosed. The filter contains activated carbon and a thermosetting or thermoplastic resin binder, and is a selfcontained disposable filter having voids in sufficient amount to provide a pressure drop of about 0 to 0.5 inches of water at a face velocity of up to approximately 450 feet per minute. The method includes mixing the dry ingredients and sufficient water, charging to a mold, applying sufficient pressure, discharging the green mold piece and curing the resulting filter. By the use of granular activated carbon a larger filled face area/void ratio may be provided for certain applications since the granular material provides some permeability through the filled face area while the voids permit control of the pressure drop characteristics of the filter.

4 Claims, 2 Drawing Figures

METHOD OF MANUFACTURING A SELF-CONTAINED LOW PRESSURE DROP FILTER

This application is a divisional of copending application Ser. No. 121,989, filed Mar. 8, 1971 now U.S. Pat. No. 3,715,869 which, in turn, is a continuation-in-part of copending application Ser. No. 764,788, filed Oct. 3, 1968, now U.S. Pat. No. 3,611,678.

This invention relates to the manufacture of filters, and more particularly to filters for removing odors from air. More specifically, this invention related to the manufacture of filters of the type used to remove odors from air by having the air to be treated circulated through the same.

It is well known in the treatment of air to remove undesirable odors by means of filters of one type or another. It has been found that certain adsorbent materials such as activated carbon are particularly useful for this purpose. It is common practice to place a canister of loosely packed activated charcoal in a confined space from which odors are to be adsorbed, for example, in refrigerators. In order to remove odors from the air in larger, unconfined areas, some means must be provided to circulate the air through the adsorbent material. To this end, devices have been used which consist merely of a fan in operable relationship with a canister of adsorbent material. More commonly, however, the adsorbent material is used in conjunction with a device whose primary function is to treat the air in some other manner. Such devices include air humidifiers or dehumidifiers as well as air conditioners for either cooling or heating the air. Another such device is the air circulating system of a frost-free refrigerator.

Such devices as air conditioners are particularly adaptable to serving the second function of passing the air through an adsorbent material. The use of a tubular canister of adsorbent material, however, is particularly unwieldy in air conditioners. Other means of containing the adsorbent material have been tried, but have all suffered serious drawbacks. Flat, rectangular confining means have been used, but these are expensive and clumsy. Attempts have been made to bind the adsorbent material with a resin of one type or another, but these attempts have resulted in extremely fragile filters which possess certain disadvantages common to all types of filters, namely poor adsorption and high pressure drop, thereby resulting in a loss of efficiency. Further, these filters, due to their fragility, require some sort of a container to provide the mechanical support which they inherently lack. Such a mechanical support invariably leads to further loss of efficiency through pressure drop. Due to the high cost of manufacture of these filters, they suffer the further disadvantage of not being disposable. Furthermore, they are equally fragile in their "green" or uncured state. Because of this fragility, they must be left in the mold during curing.

Accordingly, it is a primary object of the present invention to manufacture a filter which is free of the aforementioned and other such disadvantages.

More specifically, it is an object of the present invention to manufacture a filter which has good adsorptivity, is self-contained, is disposable, and has low pressure drop.

Another primary object of the present invention is to manufacture a filter which can be easily manufactured at low cost and which can be utilized in existing air conditioning equipment.

Yet another important object of the present invention is to manufacture a self-supporting, self-contained, filter.

Still another object of the present invention, consistent with the foregoing objects, is to provide a filter with a honey-comb type structure which is simple to install and remove for replacement.

A further primary object of the present invention is to provide a method of making a filter, according to the preceding objects, wherein the filter is self-supporting in the green state and can, therefore, be removed from the mold prior to curing.

This invention will be better understood, and the objects other than those set forth above will become apparent, when consideration is given to the following detailed description of the preferred and illustrative embodiment of the invention and to the annexed drawing.

Accordingly, to satisfy the objects of the present invention there is provided an adsorptive, bonded activated carbon, self-contained, self-supporting, disposable, low pressure drop filter and a method for making the same. The filter meets the high-volume, low pressure drop prerequisites of air "conditioning" systems, as well as those with less stringent air flow - pressure drop characteristics. It presents the full surface area of the bonded carbon to the air flow, thereby allowing maximum utilization of the carbon for vapor phase adsorption. The filter contains activated carbon and a thermosetting or thermoplastic binder and is molded and cured. The filter is essentially a grid of circular holes of such a size that the ratio of void to filled face area is between 60:40 and 16:84.

The filter is produced by mixing from approximately 45 to approximately 90 percent activated carbon with approximately 55 to approximately 10 percent by weight of resin. Sufficient water for processing, preferably from about 24 to 45 percent of the total mixture is added and mixed in. The mixture is charged to a pin mold where it is compressed before discharging and curing. The compression force applied by the mold is preferably in the range of about 20 to 50 tons. This force is achieved by applying a pressure of at least about 250 psi. The curing times and temperatures are, obviously, dependent upon the thickness of the filter and the particular resin used for the binder. It has been found that for most resins a temperature range of from about 225°F. to about 450°F. for a time period of from about 2 hours to about 15 minutes is satisfactory.

While in the foregoing discussion the method of the present invention has been set forth in terms of thoroughly mixing the dry ingredients before adding the water, this sequence of steps is not necessarily critical. Alternatively, water can be added to the mixed activated carbon and binder, or to the carbon alone followed by addition of the binder. As another alternative, the water, carbon, and binder can be added at one time.

IN THE DRAWING

Figure 2:
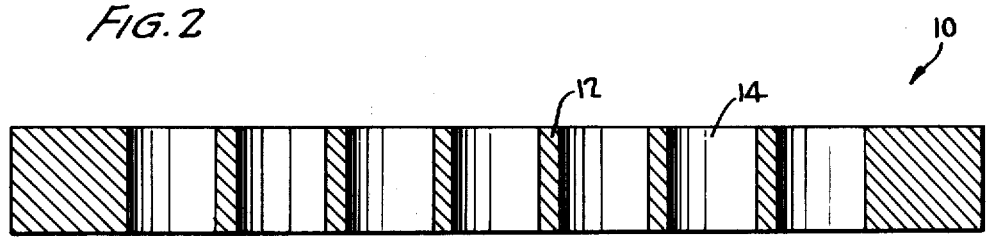

FIG. 1 is a perspective view, partially broken away, of a filter according to this invention; and FIG. 2 is a vertical cross-section taken on the line 2—2 of FIG. 1.

Referring to the drawings there is shown in FIG. 1 a filter, generally designated by the numeral 10, made according to the present invention. The filter 10 comprises a finely divided or granular adsorbent substance, preferably activated charcoal, and a resin binder. The bonded charcoal block 12 has a plurality of holes 14 therein such holes 14 being preferably circular holes. When considering either of the opposed faces of the block 12, the ratio of void to filled face area is between about 60:40 and 16:84, such a construction giving pressure drop of approximately 0.05 inch of water at 350 feet per minute face velocity for the 60:40 ratio, which is an acceptable pressure drop for a filter to be used in conjunction with an air conditiong unit, and approximately the same pressure drop for the 16:84 ratio at the 30–40 feet per minute face velocity normally encountered in frost-free refrigerator applications.

By using a larger particle size activated carbon, for example, 20 × 50 mesh, or even 14 × 20 mesh, as compared to 80 × 325 mesh, it has been found that the filled face area/void ratio can be as high as 84:16 since some permeability exists through the filled face area itself. This feature is particularly useful in environments requiring low air volumes, low pressure drops, such as in refrigerator filters.

This void to filled surface area ratio is achieved in a preferred embodiment by providing holes 14 which are approximately 0.40 inch in diameter and are spaced approximately 0.50 inch on center. The peripheral holes 16 are spaced approximately 0.75 inch on center from the edge of the filter. It can be readily seen, that the ratio of the holes to the filled surface area in which they are contained, excluding the marginal area, is approximately 50:50 in this embodiment. This is a ratio which is approached by the total surface area of the filter as the overall dimensions get larger.

In a more preferred embodiment, the holes 14 are approximately ¼ inch in diameter and are spaced approximately ½ inch on center.

Having considered certain physical characteristics of the filter of the present invention, attention is called to the method of producing the same. Generally, the method includes the steps of mixing the activated carbon, a binder and sufficient water for processing. After thorough mixing, the mixture is charged to a pin mold and a pressure of at least about 250 psi is applied. The compressed piece is discharged from the mold and cured. The curing time and temperature is generally dependent upon the type of resin being used, but usually falls in a range of about 225° F. to about 450° F. for about 2 hours to about 15 minutes. The binder can be either a thermosetting or a thermoplastic resin, with thermosetting resins being preferred. The proportions of activated carbon to resin in the dry mix are preferably from about 45 to about 90 percent by weight of activated carbon and from about 55 to about 10 percent by weight of resin. The preferred composition, using a thermosetting resin, contains 26 percent resin and 74 percent activated carbon in the dry mix.

The adsorbent material used in this invention is preferably finely powdered activated carbon, although a homogeneous blend of granular carbon whose maximum size is ⅝ the wall thickness between the void holes with powdered carbon can be used as long as there is sufficient powdered carbon to form a solidly filled bonded structure. Of course, the proportions of carbon to resin remain in the same range even when using a blend of granular carbon with powdered carbon. Typical properties of a suitable carbon are as follows: iodine number, min. - 900; density, min. - 0.25 g/cc; and mesh size, max. - 20. The carbon used in Examples 1–18 has approximate properties as shown in Table I.

TABLE I

| Properties | |
|---|---|
| iodine number, min. | 1100 |
| density, g/cc, min.* | 0.40 |
| mesh size | 80 × 325 |
| pore volume, cc/g, min. | 0.65 – 0.90 |
| surface area, m²/g, min. | 1200 |

*Density is normally determined on larger size particle material than 80 × 325 as the densities determined on this size are very erratic. The typical densities of two suppliers' material is 0.45 g/cc.

Typical thermosetting resins useful in this invention are the phenolic resins which are short flow, fast cure, single stage phenolics. The short flow, approximately 25 mm, short cure, approximately 30 seconds, thermosetting resins are particularly useful, although longer flow and longer cure materials can be used. The following Examples 1–16 were carried out using a void to filled face ratio of approximately 50:50.

EXAMPLE 1

A formulation was made containing five pounds of 80 × 325 mesh carbon, 1.8 pounds of short flow, fast cure, single stage phenolic resin and 3.2 pounds of water. The ingredients were premixed and intimately blended. A pin mold was then filled by volume and 50 tons pressure was applied. The compressed carbon piece, or green mold, was discharged from the mold and cured for 30 minutes at 300° F. The finished filter was approximately 4 inches square by approximately ½ inch thick and weighed 59.2 grams bone dry. After room conditioning for 24 hours, it picked up 2.4 percent moisture. The bonded dry filter was composed of 73.5 percent carbon and 26.5 percent phenolic resin. Its adsorption efficiency, compared to that of samples made as described in the following Examples, is shown in Table III hereinbelow.

While the thermosetting resin is preferred in this invention, it has been found that filters bonded with thermoplastic resin are also useful, having greater resiliency and flex strength and, therefore, being tougher and more acceptable relevant to strength — handling properties. The use of thermoplastic binder, however, is limited to some extent by the temperature of the use environment. The thermoplastic binders usually soften at temperatures above about 200° and 250° F. The thermoplastic bonding agent can comprise any thermoplastic material, such as polyhydrocarbons having from 2 to 10 carbon atoms, preferably polyolefins, e.g., polyethylene and polypropylene, other thermoplastic such as vinyl acetate, other vinyl homopolymers and copolymers, plasticized cellulose acetate, Artrite (a thermoplastic polyester resin), Escorex (a fine powdered petroleum hydrocarbon resin), and combinations of any of the above. The best results are obtained, however, when the bonding agent is a polyolefin, the preferred polyolefins being polyethylene, polypropylene, or combinations thereof.

EXAMPLE 2

A mixture was made of 47.6 parts of activated charcoal and 20.4 parts of a low density thermoplastic resin with sufficient water for processing. A mold was charged as in Example 1 and a compression force of between about 20 and about 50 tons was applied. The compressed piece, was discharged and fused at about 340° F. for about 45 minutes. The composition of the resulting filter, on the dry basis, was about 30 percent binder and about 70 percent carbon.

EXAMPLES 3 – 15

The same procedure was followed using the proportions shown respectively in Table II.

TABLE II

| | CARBON | | | RESIN | |
|---|---|---|---|---|---|
| Example | Parts | Percent | Type* | Parts | Percent |
| 3 | 47.6 | 70 | TP | 20.4 | 30 |
| 4 | 54.5 | 80 | TP | 13.5 | 20 |
| 5 | 54.5 | 80 | TP | 13.5 | 20 |
| 6 | 54.5 | 80 | TP | 13.5 | 20 |
| 7 | 54.5 | 80 | TP | 13.5 | 20 |
| 8 | 57.8 | 85 | TP | 10.2 | 15 |
| 9 | 57.8 | 85 | TP | 10.2 | 15 |
| 10 | 46.2 | 68 | TS | 21.8 | 32 |
| 11 | 46.2 | 68 | TS | 21.8 | 32 |
| 12 | 50 | 73.5 | TS | 18 | 26.5 |
| 13 | 50 | 73.5 | TS | 18 | 26.5 |
| 14 | 50 | 73.5 | TS | 18 | 26.5 |
| 15 | 50 | 73.5 | TS | 18 | 26.5 |

*TP — thermoplastic, TS — thermosetting

The filters of Examples 1 through 15 were then tested to determine the relative adsorption efficiency by carbon tetrachloride adsorption. The basis for the test was unbonded carbon whose adsorption efficiency was considered to be 100 percent. Each sample was run for 72 hours. The results are shown in Table III.

TABLE III

| | Relative CCl₄ Adsorption Efficiency | |
|---|---|---|
| Example | Percent Efficiency | Average Percent Efficiency |
| 1 | — | 92.5 |
| 2 | 98.0 | |
| 3 | 98.5 | 98.25 |
| 4 | 96.5 | |
| 5 | 96.0 | 96.2 |
| 6 | 94.5 | |
| 7 | 96.0 | 95.2 |
| 8 | 101.0 | |
| 9 | 101.0 | 101.0 |
| 10 | 78.5*(89.2 72 Hrs.) | |
| 11 | 80.6* | 79.6* |
| 12 | 75.5* | |
| 13 | 76.5*(88.0 72 Hrs.) | 76.0* |
| 14 | 86.0 | |
| 15 | 90.5 | 88.2 |

*24 hour CCl₄ adsorption

Thus, it can be seen that the relative adsorption efficiency in each case is sufficiently high to produce satisfactory results, with the thermoplastic bonded filters having a somewhat greater adsorption efficiency. Each of the filters produced essentially no pressure drop at 300 feet per minute face velocity and no more than 0.3 in. of water at 350 feet per minute face velocity. The mechanical strength was satisfactory in each case, with the filters of Examples 2 and 3 exhibiting the most desirable characteristics.

EXAMPLE 16

A filter was made using 23.8 percent 80 × 325 mesh powdered charcoal, 23.8 percent 20 × 50 mesh granulated charcoal, 20.4 percent thermoplastic resin, and 32 percent water. The procedure of Example 2 was followed. The filter exhibited satisfactory characteristics.

EXAMPLE 17

Example 1 is repeated with a void to filled face ratio of 40:60.

EXAMPLE 18

Example 1 is repeated with a void to filled face ratio of 60:40.

Essentially the same results as with Example 1 are obtained with Example 17 and Example 18.

EXAMPLE 19

A filter was made, following the procedure of Example 1, from the following formulation:

TABLE IV

| Ingredients | Batch Weight (Pounds) | Formulation |
|---|---|---|
| 20 × 50 mesh carbon | 380 | 46% |
| phenolic resin | 95 | 11½% |
| water | 351 | 42½% |

The filter had a bone-dry weight of 68.1 grams and was composed of 20% resin and 80% carbon. After 24 hours room conditioning it picked up 2.4 % moisture. The difference in weight between this filter and that of Example 1 is due to the normally higher apparent density of 20 × 50 mesh carbon vs. the 80 × 325 mesh carbon from which the filter of Example 1 was made.

With activated carbon of this type and a thermoplastic resin, a filled face area to void ratio of about 84:16 can be produced for certain applications as discussed above.

EXAMPLE 20

Filters made according to Example 2 were measured for load deflection and torque-twist deflection. The load deflection was measured by supporting the filter at both ends and loading a 5 pound bar weight across its center. The torque-twist deflection was measured by holding one end of the filter in a fixed channel and twisting the other end to a specific deflection. In each instance the filter must not crack within a given deflection. The results were:

| | Sample 1 | Sample 2 |
|---|---|---|
| | (10×10½×½ inch) | (9×18×½ inch) |
| Load deflection | ¼" | ⅜" |
| Torque-twist deflection | 12° | 17° |

It is, therefore, apparent that the filter according to the present invention is self-sustaining.

In another embodiment of the present invention a filter is provided with an improved single path filtration efficiency. In this embodiment a filter according to the preceding examples composed of a bonded granulated carbon is used as a substrate and skeleton structure which is then coated with a fine layer of high activity, fine mesh carbon with a binder. This coating is of extremely low density and of a structural nature so that minimum interference would be offered to the air permeability of the substrate.

The binder composition of the fine carbon coating could be identical with the binder used in the substrate, that being a thermoplastic or a thermosetting resin. Alternatively, the binder could be a substance such as carboxymethyl cellulose or the like. In this case the carboxymethyl cellulose is used to form a slurry with the fine carbon for lightly coating the subsubstrate. If the same type of binder as used in the substrate is used for the coating, the exact type of binder would be chosen by reference to such characteristics as its melting temperature.

In another aspect of this embodiment, a blowing agent can be added to the carbon-binder slurry to assist in creating a highly permeable coating. Typical carbonate blowing agents that readily decompose in the 200° to 400°F. temperature range could be used.

EXAMPLE 21

A grid filter according to Example 2 was prepared by charging a pin mold and ejecting the green mold piece from the mold. The green mold piece was then curtain coated with a slurry of fine powdered activated carbon (325 or smaller mesh) and carboxymethyl cellulose. The slurry was prepared by mixing the carbon and the binder with sufficient water for processing. The excess water was then driven off by use of hot air and the filter was cured in an oven at 450° F.

Thus, it can be seen that the objects set forth at the outset of this specification have been successfully achieved. Moreover, while there are shown and described present preferred embodiments of the invention, it is to be distinctly understood that the invention is not limited thereto, but may be otherwise variously embodied and practiced within the scope of the following claims.

Accordingly, what is claimed is:

1. A method of making a self-contained, low pressure drop filter comprising a grid with a plurality of through-openings forming voids, said filter having a ratio of void to filled face area of between about 60:40 and 16:84, said method comprising the steps of:
    a. mixing activated carbon, a resin selected from the group consisting of thermosetting and thermoplastic resins; and sufficient water for processing;
    b. charging the resulting mixture to a pin-mold;
    c. applying at least about 250 psi pressure to said mixture to form a compressed piece;
    d. discharging the compressed piece from said mold;
    e. when a thermosetting resin is used, curing said compressed piece, and when a thermoplastic resin is used, fusing said compressed piece, thereby forming a bonded activated carbon filter; and
    f. coating said compressed piece with a slurry of fine activated carbon and binder prior to curing or fusing.

2. A method as defined in claim 1, wherein said slurry contains water, further comprising the step of removing at least some of said water prior to curing.

3. A method as defined in claim 1, wherein said slurry further includes a blowing agent.

4. A method as defined in claim 1, wherein said slurry is applied to said compressed piece by curtain coating.

* * * * *